Patented Jan. 25, 1949

2,460,265

UNITED STATES PATENT OFFICE 2,460,265

ARYLALKYLNITROALCOHOLS

John B. Tindall, Terre Haute, Ind., assignor to Commercial Solvents Corporation, Terre Haute, Ind., a corporation of Maryland No Drawing. Application June 27, 1945, Serial No. 601,944

4 Claims. (Cl. 260—618)

This invention relates to new and useful γ-phenyl-β-nitroalkanols and to a method for preparing them. More particularly, it relates to new phenylnitroalkanols having the following general formula:

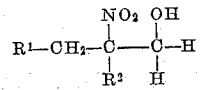

wherein $R^1$ represents a phenyl or alkylated phenyl radical and $R^2$ may be hydrogen or alkyl radicals.

Among the compounds included by the above formula there may be mentioned as illustrative, the following: 2-nitro-2-methyl-3-phenyl-1-propanol; 2-nitro-2-ethyl-3-phenyl-1-propanol; 2-nitro-2-propyl-3-phenyl-1-propanol; 2-nitro-2-methyl-3(m-methylphenyl)-1-propanol; 2-nitro-2-methyl-3-(p-isopropylphenyl)-1-propanol and the like.

The new compounds of my invention have the singular arrangement of three adjacent carbon atoms substituted successively with a phenyl or alkylated phenyl group, as illustrated in the general formula.

These new compounds may be prepared by treating 1-phenyl-2-nitroalkanes with an aldehyde in the presence of a basic catalyst, preferably in the presence of an inert liquid reaction medium.

In carrying out the preparation of my new compounds I mix the 1-phenyl-2-nitroalkane with an equimolecular quantity or preferably a slight excess of the desired aldehyde, in a liquid medium which is inert to the reaction for example, methanol, ethanol, dioxane, benzene or the like and to this mixture add a small quantity of a base such as sodium hydroxide, potassium hydroxide or the like. The mixture may be gently heated if desired or allowed to stand at room temperatures until the reaction is complete, usually a period of from one to several hours being sufficient. The mixture is then neutralized and the liquid reaction medium is then removed as by distillation. The final product remains in the residue, and, if a solid, may be recovered directly, or recrystallized if desired. If a liquid, it may be purified if desired, by known means such as by distillation or by dissolving in a non-aqueous solvent, washing with water to remove water-soluble impurities, and finally recovering as a residue by removal of the solvent.

The 1-phenyl-2-nitroalkanes which serve as the starting materials in the preparation of my new compounds may be prepared by any desired means. However, I prefer to prepare them in accordance with the procedure described in co-pending application Serial No. 600,654 filed June 20, 1945, in the name of Charles D. Hurd, which involves selective hydrogenation of 1-phenyl-2-nitroalkenes under conditions such that the double bond of the nitroalkene is reduced, without reduction of the nitro group to the amino group.

The following specific examples will serve to illustrate my invention.

Example I

Three parts of .86 N potassium hydroxide in methanol was added to a solution of 33 parts of 1-phenyl-2-nitro-propane and 15 parts of 40% aqueous formaldehyde in 70 parts of methanol. The mixture was allowed to stand, and at the end of one hour, it was neutralized with hydrochloric acid and the solution evaporated to dryness. The white solid residue amounted to 37.7 parts corresponding to a yield of 96.5% of 2-nitro-2-methyl-3-phenyl-1-propanol. The product was recrystallized from methylcyclopentane. The purified product had a melting point of 71.9° C. and a nitrogen content of 7.10% as compared to a theoretical value of 7.18%.

Example II

To a solution of 17.9 parts of 1-phenyl-2-nitrobutane and 7.5 parts of 40% aqueous formaldehyde in 27 parts of methanol was added two parts of 1.18 N potassium hydroxide in methanol, and the solution was heated to 70° C. The mixture was allowed to cool to room temperature, and allowed to stand for twenty-four hours. The solution was then neutralized with hydrochloric acid. The methanol was removed by distillation, and the residue was extracted with benzene. The benzene solution was washed two times with water and dried to constant weight in a vacuum desiccator. The light yellow liquid residue amounted to 18.9 parts of 2-nitro-2-ethyl-3-phenyl-1-propanol, corresponding to a yield of 90.5%. The product was distilled and found to have a refractive index of $N_D^{20}=1.5329$, specific gravity at $$\frac{20°}{20°} C.$$

of 1.1614 and a nitrogen content of 6.55% as compared to a theoretical value of 6.70%.

Example III

To a solution of 13.7 parts of 1-phenyl-2-nitropentane and 5.5 parts of 40% aqueous formaldehyde in 25 parts of methanol was added 2 parts of 1.18 N potassium hydroxide in methanol, and the mixture was heated to 65° C. It was allowed to cool to room temperature and allowed to stand for twenty hours. The mixture was then neutralized with HCl, and distilled to remove the methanol. The residue was dissolved in benzene and washed two times with water. The benzene was evaporated off, and the residue amounted to 14.1 parts of 2-nitro-2-propyl-3-phenyl-1-propanol corresponding to a yield of 89%. The product had a refractive index $N_D^{20}=1.5262$, specific gravity at $$\frac{20°}{20°} C.$$

of 1.1383, and a nitrogen analysis of 6.38% as compared to a theoretical value of 6.28%.

*Example IV*

To a solution of 70 parts of 2-nitro-1-(m-methyl-phenyl)-propane and 32.5 parts of 40% aqueous formaldehyde in 100 parts of methanol, was added two parts of 3.033 N potassium hydroxide in methanol. The mixture was heated to 65° C. and allowed to stand for six hours, whereupon the mixture was neutralized with 1.2 parts of 6 N hydrochloric acid. The mixture was distilled under vacuum to remove the methanol and water, and the residue was dissolved in benzene. The solution was filtered to remove salt and distilled, resulting in the recovery of 58.9 parts of 2-nitro-2-methyl-3-(m-methylphenyl)-1-propanol corresponding to a yield of 72%. The product had a refractive index $N_D^{20}=1.532$, a specific gravity at $$\frac{20°}{20°} C.$$

of 1.150 and a nitrogen content of 6.59% as compared to a calculated nitrogen value of 6.69%. On standing the product crystallized to form a solid having a melting point of 58° C.

*Example V*

To a solution of 49.4 parts of 2-nitro-1-(p-isopropylphenyl)-propane and 20 parts of 40% aqueous formaldehyde, in 80 parts of methanol, was added one part of 3.033 N potassium hydroxide in methanol. The mixture was heated to 65° C., and allowed to stand for 22 hours.

The potassium hydroxide was then neutralized with 0.6 part of 6 N hydrochloric acid. One hundred eighty parts of benzene were added and the mixture distilled to remove methanol and water, and finally benzene. The solid residue of 2-nitro-2-methyl-3-(p-isopropylphenyl)-1-propanol amounted to 51.3 parts corresponding to a yield of 91.0%. The solid residue was recrystallized from cyclohexane. The purified product had a melting point of 85.6° C. and a nitrogen content of 5.6% as compared to a calculated nitrogen value of 5.9%.

The new compounds of my invention are useful as chemical intermediates and are particularly useful in the preparation of the corresponding γ-phenyl-β-aminoalkanols which have useful physiological properties and which are described in my copending application, Serial No. 601,943 filed as of even date herewith, now abandoned.

While the above describes the preferred embodiments of my invention it will be understood that departures may be made therefrom within the scope of the specification and claims.

What is claimed is:
1. 2-nitro-2-methyl-3-phenyl-1-propanol.
2. 2-nitro-2-ethyl-3-phenyl-1-propanol.
3. 2-nitro-2-propyl-3-phenyl-1-propanol.
4. As new compositions of matter γ-phenyl-β-nitroalkanols having the following structure:

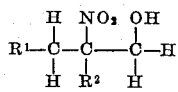

wherein $R^1$ represents a member selected from the group consisting of phenyl and alkylated phenyl radicals and $R^2$ represents a member selected from the group consisting of hydrogen and alkyl radicals.

JOHN B. TINDALL.

REFERENCES CITED

The following references are of record in the file of this patent:

UNITED STATES PATENTS

| Number | Name | Date |
|---|---|---|
| 2,132,352 | Hass | Oct. 4, 1938 |
| 2,135,444 | Vanderbilt | Nov. 1, 1938 |